(12) United States Patent
Mitchell

(10) Patent No.: US 7,606,496 B1
(45) Date of Patent: Oct. 20, 2009

(54) COMMUNICATIONS AND POSITION LOCATION SYSTEM AND METHOD

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 597 days.

(21) Appl. No.: 11/143,549

(22) Filed: Jun. 2, 2005

(51) Int. Cl.
*H04B 10/00* (2006.01)

(52) U.S. Cl. .................................. 398/125; 398/188

(58) Field of Classification Search ............ 398/125, 398/129, 118
See application file for complete search history.

(56) References Cited

U.S. PATENT DOCUMENTS

| | | | | |
|---|---|---|---|---|
| 3,243,592 A * | 3/1966 | Tomiyasu et al. | ........... | 398/125 |
| 3,617,750 A * | 11/1971 | Walker | ............ | 398/116 |
| 3,662,180 A * | 5/1972 | Jorgensen et al. | ........... | 342/386 |
| 3,789,397 A * | 1/1974 | Evans | ............ | 342/59 |
| 3,876,308 A * | 4/1975 | Alpers | ............ | 356/139.06 |
| 4,079,246 A * | 3/1978 | Misek | ............ | 398/161 |
| 4,279,036 A * | 7/1981 | Pfund | ............ | 398/125 |
| 4,570,060 A * | 2/1986 | Tsumura et al. | ........... | 250/203.1 |
| 4,764,982 A * | 8/1988 | Pfund | ............ | 398/125 |
| 4,818,107 A * | 4/1989 | Ono et al. | ............ | 356/622 |
| 4,829,597 A * | 5/1989 | Gelbwachs | ............ | 398/104 |
| 5,038,406 A * | 8/1991 | Titterton et al. | ............ | 398/125 |
| 5,175,664 A * | 12/1992 | Diels et al. | ............ | 361/213 |
| 5,179,420 A * | 1/1993 | So et al. | ............ | 356/73.1 |
| 5,307,194 A * | 4/1994 | Hatton et al. | ............ | 398/130 |
| 5,416,627 A * | 5/1995 | Wilmoth | ............ | 398/129 |
| 5,463,710 A * | 10/1995 | Filgas et al. | ............ | 385/90 |
| 5,726,855 A * | 3/1998 | Mourou et al. | ............ | 361/213 |
| 6,175,437 B1 * | 1/2001 | Diels et al. | ............ | 398/201 |
| 6,405,132 B1 * | 6/2002 | Breed et al. | ............ | 701/301 |
| 6,424,442 B1 * | 7/2002 | Gfeller et al. | ............ | 398/135 |
| 6,429,812 B1 * | 8/2002 | Hoffberg | ............ | 342/357.1 |
| 6,437,890 B1 * | 8/2002 | Scheps | ............ | 398/104 |
| 6,476,908 B1 * | 11/2002 | Watson | ............ | 356/214 |
| 6,501,578 B1 * | 12/2002 | Bernstein et al. | ............ | 398/201 |
| 6,618,496 B1 * | 9/2003 | Tassakos et al. | ............ | 382/154 |
| 6,636,653 B2 * | 10/2003 | Miracky et al. | ............ | 385/14 |

(Continued)

OTHER PUBLICATIONS

Debbie Kedar and Shlomi Arnon, "Non-line-of-sight optical wireless sensor network operating in multiscattering channel", Applied Optics, vol. 45, No. 33, Nov. 20, 2006.*

(Continued)

*Primary Examiner*—Ken N Vanderpuye
*Assistant Examiner*—Danny W Leung
(74) *Attorney, Agent, or Firm*—Daniel M. Barbieri

(57) ABSTRACT

A laser communications and position location system has a laser transmitter with a laser array radiating modulated laser beams upward at convergence angles that determine altitude of a free space junction where the beams converge. The free space junction scatters the modulated laser beams and a laser receiver receives the scattered modulated laser beam light and recovers the data. A modulator modulates the laser array with data. The laser transmitter may include a data link to transmit the free space junction position to the laser receiver to aid in finding it. The laser receiver has an optical detector with an adjustable field of view and gain to minimize background light noise and to demodulate the received modulated scattered laser beams. The laser receiver determines a precise location of the laser transmitter upon finding the free space junction.

22 Claims, 5 Drawing Sheets

U.S. PATENT DOCUMENTS

| | | | | |
|---|---|---|---|---|
| 6,657,783 | B1* | 12/2003 | Presby et al. | 359/399 |
| 7,058,306 | B1* | 6/2006 | Smith | 398/118 |
| 7,079,774 | B2* | 7/2006 | Sidorovich et al. | 398/129 |
| 7,092,637 | B2* | 8/2006 | Haruyama | 398/129 |
| 7,200,334 | B2* | 4/2007 | Gayrard et al. | 398/118 |
| 7,257,327 | B2* | 8/2007 | Small | 398/118 |
| 7,406,263 | B2* | 7/2008 | Graves et al. | 398/119 |
| 7,446,861 | B2* | 11/2008 | Ouchi | 356/5.01 |
| 2002/0131121 | A1* | 9/2002 | Jeganathan et al. | 359/152 |
| 2002/0163699 | A1* | 11/2002 | Kavehrad et al. | 359/172 |
| 2003/0142023 | A1* | 7/2003 | Djuknic | 343/703 |
| 2007/0070358 | A1* | 3/2007 | Ouchi | 356/614 |
| 2007/0253713 | A1* | 11/2007 | Reilly et al. | 398/96 |
| 2008/0212970 | A1* | 9/2008 | Shpantzer | 398/118 |
| 2008/0273190 | A1* | 11/2008 | Smith | 356/4.01 |

OTHER PUBLICATIONS

Debbie Kedar, Eliezer Devila, Dvir Limon and Shlomi Arnon, "Optical Wireless Sensor Network in Multiscattering Channel: Laboratory Experiment", Free-Space Laser Communications V, Proc. of SPIE vol. 5892 (2005).*

Gary A. Shaw†, Melissa Nischan, Mrinal Iyengar, Sumanth Kaushik, and Michael K. Griffin, "NLOS UV Communication for Distributed Sensor Systems", Integrated Command Environments, Proceedings of SPIE vol. 4126 (2000).*

"Self-Channeling of High Peak Power Femtosecond Laser Pulses in Air" by A. Braun et al., Optics Letters vol. 20, No. 1, Jan. 1, 1995, pp. 73-75.

"Collapsing Light Really Shines", by A. Gaeta, Science vol. 301, Jul. 4, 2003, pp. 54-55.

"Research on Light Strings a Potential Industry Boon" Science Daily on-line article from the University of Arizona Jul. 23, 1999.

* cited by examiner

COMMUNICATIONS AND POSITION LOCATION SYSTEM AND METHOD

BACKGROUND OF THE INVENTION

The present invention relates to communications and position location systems and specifically to a communications and position location system that may utilize laser light strings or normal laser light propagation.

Global positioning system (GPS) navigational and position location systems are often used by military and civilian naval, ground, and airborne vehicles for navigation. GPS systems can experience blackout areas or regions when line-of-site (LOS) is broken with the satellites due to signal blockage. For example GPS systems often experience loss of signal when they are operated in dense urban environments next to large buildings (e.g., urban canyon). Additionally recent attempts at augmenting GPS for this coverage deficiency has had mixed success and has not resulted in a low-cost widespread solution.

Communications systems operating in the VHF/UHF and higher frequency bands have LOS problems similar to GPS. Vehicles operating in a city or in rugged or mountainous terrain have difficulty communicating due to signal link-loss and blockage. Furthermore, there are few technical options for delivering high-speed data, video, and position location Information from a mobile unit or a large number of mobile units. For example, mobile units may include emergency response vehicles requiring broadband transmission of video from an emergency scene back to an emergency operations center. Rough terrain, line-of sight, ground network infrastructure and antenna technical challenges generally force or limit options having lower or unsatisfactory bit rate solutions. There are many solutions for providing high-speed data to a mobile unit. However most high data rate (broadcast) data channels options for mobile units with antenna height disadvantages do not work well for transmissions from the mobile units.

Laser diode technology has advanced in recent years with the development of low cost direct emission devices. These direct emission devices offer high-speed modulation capabilities for laser data communications systems. These state of the art laser diodes are available in several power levels and wavelengths including green, blue, and blue violet.

Laser communications systems known in the art provide end-to-end or point-to-point systems where a laser transmitter must be pointed directly at a laser receiver to establish communications. As with some radio communications systems, these laser communications systems are not useable in rough terrain or urban canyon situations.

There is a need for a position location and communications system that not only is less susceptible to blackout prone and high loss areas, but has wide bandwidth for high-speed data communications and is inherently low cost.

SUMMARY OF THE INVENTION

A laser communications and position location system using laser light beam concentration and atmospheric scattering is disclosed. The laser communications and position location system has a laser transmitter for radiating laser beams upward at convergence angles. The laser beams converge at a free space junction that provides a concentration of the laser beams. The laser beams are scattered at the free space junction and a laser receiver receives scattered laser beam light. The convergence angles determine an altitude of the free space junction. The laser beams are modulated by data at the laser transmitter to provide a data signal received by the laser receiver.

The laser transmitter further comprises a laser array. The laser array comprises a plurality of laser diodes arranged in a circular array. A modulator modulates the array of laser diodes with the data from a data source. The laser diodes may operate at a wavelength optimized for free-space transmission using continuous wave (CW) or ultra-short pulses. The laser transmitter may transmit a unique identification code. The laser transmitter may include a data link for transmitting a position of the free space junction to the laser receiver to assist in locating the free space junction.

The laser receiver upon finding the free space junction rejects an unnecessary field of view to enhance signal-to-noise ratio. The laser receiver may also include a filter to reject unwanted light to enhance laser detection. The laser receiver determines a precise location of the laser transmitter upon finding the free space junction. The laser receiver comprises an optical detector with an adjustable optical field of view and gain to minimize background light noise and to demodulate the received scattered laser beam light.

It is an object of the present invention to provide a laser communications and position location system using atmospheric scattering from laser light under a wide range of atmospheric conditions and weather.

It is an object of the present invention to provide a communications and position location system to provide communications and position location in rugged terrain or urban canyons.

It is an advantage of the present invention to provide covert high data rate data from a mobile user.

It is an advantage of the present invention to provide precision position location of a vehicle in rugged terrain or city locations.

It is a feature of the present invention to provide high data rate low-cost communications using low-cost semiconductor lasers.

It is a feature of the present invention to provide communications and position location using a laser system with ultra-short low-power laser pulses.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein is for a communications and position location system using laser light and atmospheric scattering of laser light beams.

Low-energy laser beams can be propagated for many miles through the atmosphere subsequently forming atmospheric light filaments or light strings. Light strings have been demonstrated to produce a light source six miles in the sky. The light string phenomenon was first observed in 1995 and is described in Optics Letters, Volume 20, Issue 1, 73-75, January 1995 "Self-channeling of high-peak-power femtosecond laser pulses in air" by A. Braun et al. High-peak power extremely short laser pulses are used with pulse widths of 100 femtoseconds ($100 \times 10^{-15}$ seconds).

With long laser light pulses the laser light does not propagate as a string but produces an electrical discharge that breaks down instantly and terminates the propagation as described in a Science Daily on-line article "Research On Light Strings A Potential Industry Boon" from the University of Arizona Jul. 23, 1999. With long pulses, the atoms of air are torn apart and the laser light does not propagate. If the pulses are ultra-short, they do not have enough energy to pull many electrons from the surrounding air molecules. Instead, the ultra-short pulses create a low-energy, electrically charged air channel in which laser light propagates through the atmosphere forming the light strings and also generates atmospheric scatter from the laser beam.

Figure 1:
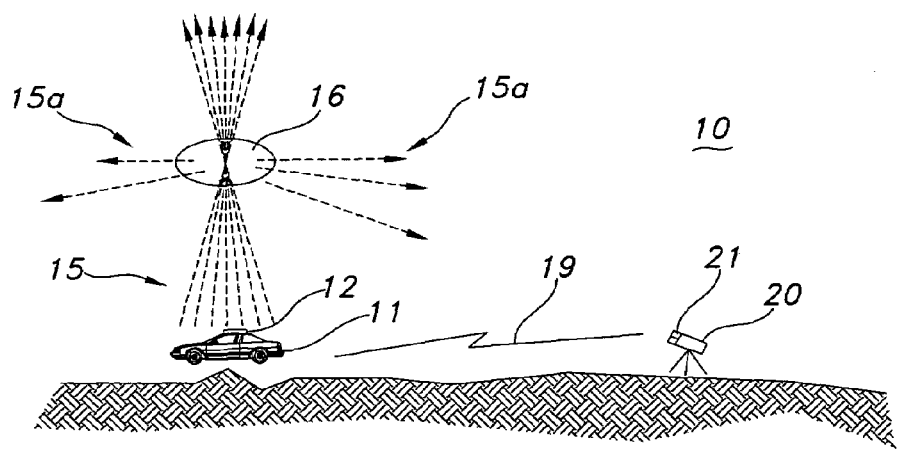
FIG. 1 shows the communications and position location system of the present invention that utilizes a laser light and atmospheric scatter phenomena for communications and position location.

A communications and position location system 10 of the present invention that may utilize the light string phenomena with ultra-short pulses or normal continuous wave (CW) laser light propagation for communications and position location is shown in FIG. 1. A vehicle 11 in FIG. 1 carries a laser array 12 of many low-power laser diodes. The laser array 12 may be mounted on the vehicle 11 rooftop. The laser array 12 generates a plurality of laser beams 15 pointed upward into the sky at convergence angles such that the laser beams 15 converge at a multi-laser beam free space junction 16. The convergence angles are shown greatly exaggerated in FIG. 1. The free space junction 16 of the laser beams 15 in the sky is at a predetermined or adjustable height as determined by the convergence angles. The altitude of the free space junction 16 may be several kilometers. At the free space junction 16 a high laser light density point exists due to the concentration of laser beams 15. Laser light beams 15 experience some percentage of scattering from the near vertical path due to atmospheric scattering with the greatest concentration of scattered laser beam light 15a occurring at the free space junction 16. Atmospheric scattering occurs due to air molecules or water droplets such as rain, snow, fog, clouds, or dust particles. This scattered laser beam light 15a from the free space junction 16 is used for communications and position location purposes in the present invention. The laser beams 15 are modulated by a laser transmitter in the vehicle 11. The free space junction 16 appears as modulated according to the phased transmit laser beams 15 emanating from the spatially distributed laser array 12 on the vehicle top. A laser receiver 20 in FIG. 1 remotely receives scattered laser beam light 15a from the free space junction 16. The laser receiver 20 may be stationary or in another vehicle (not shown). A data link 19 between the vehicle 11 and the laser receiver 20 may be included for normal communications and position location as discussed below.

The laser array 12 with spatially distributed low-power laser diodes reduces the risk of injury. A single high-power laser poses risks and is regulated when applied to free-space optical systems. Geometric concentration of low-powered devices enables a lower risk option near the laser transmitter and at high altitude, with the laser beams 15 conical apex at free space junction 16 as the only laser high power density area.

Figure 2:
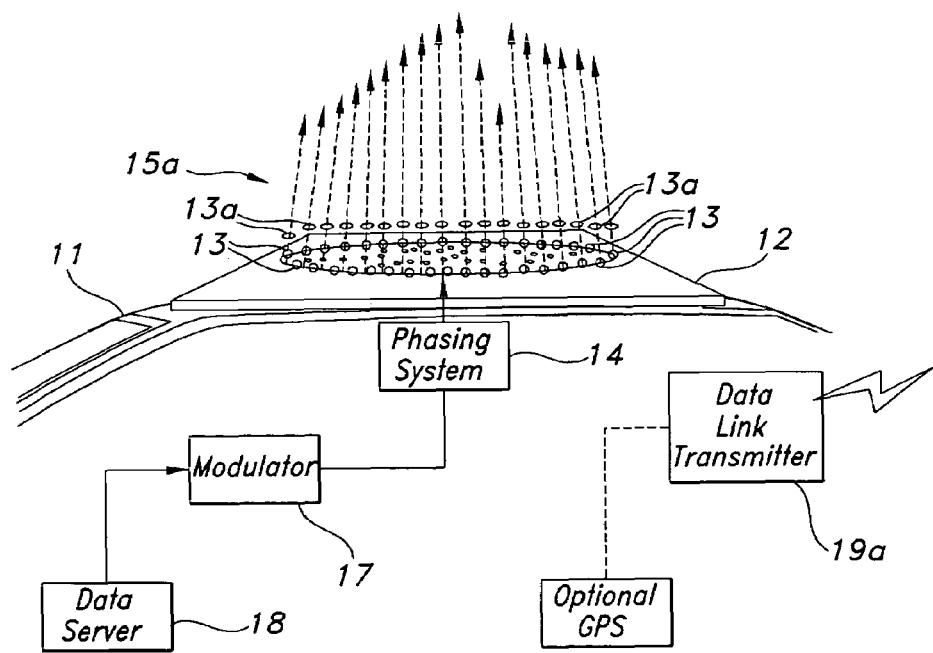
FIG. 2 shows details of a laser transmitter portion of the communications and position location system of FIG. 1.

FIG. 2 shows details of the laser transmitter on the vehicle 11 in the communications and position location system 10. The laser array 12 generates the plurality of laser beams 15 at convergence angles needed to form the free space junction 16 from a plurality of laser diodes 13. Thousands of Class IIIA laser diodes 13 may be used in the laser array 12 for example. The laser array 12 may be a circular planar array of laser diodes 13. The laser diodes 13 may be distributed in a single ring or in concentric rings in the laser array 12. The laser diodes 13 may also be evenly distributed, randomly distributed, or distributed in any fashion needed over the laser array 12 to form a desired free space junction 16. A circular configuration has its advantages in adjusting the laser beams 15 since all beams in a single circular ring have the same convergence angle and is preferred but any geometric configuration may be used for the laser diodes 13 and be within the scope of the present invention. The circular configuration enables a conical array of laser beams 15 to form an apex at the free space junction 16 at a high altitude while maintaining safe light distribution on the ground and high altitudes avoiding interference with aircraft. A rectangular, square or any other polygon configuration of the laser array 12 may also be used to form a pyramid with an apex at the free space junction 16 by proper adjustment of the convergence angles.

Optional beam expanders 13a, either fixed or adjustable, may be placed in front of each laser diode 13 to produce a pin-point beam at the free space junction 16 and diverge each beam to wider lower power density at high altitudes. Beam expanders 13a are known in the art to increase the diameter of a laser beam thereby decreasing the beam's divergence angle.

Figure 2A:
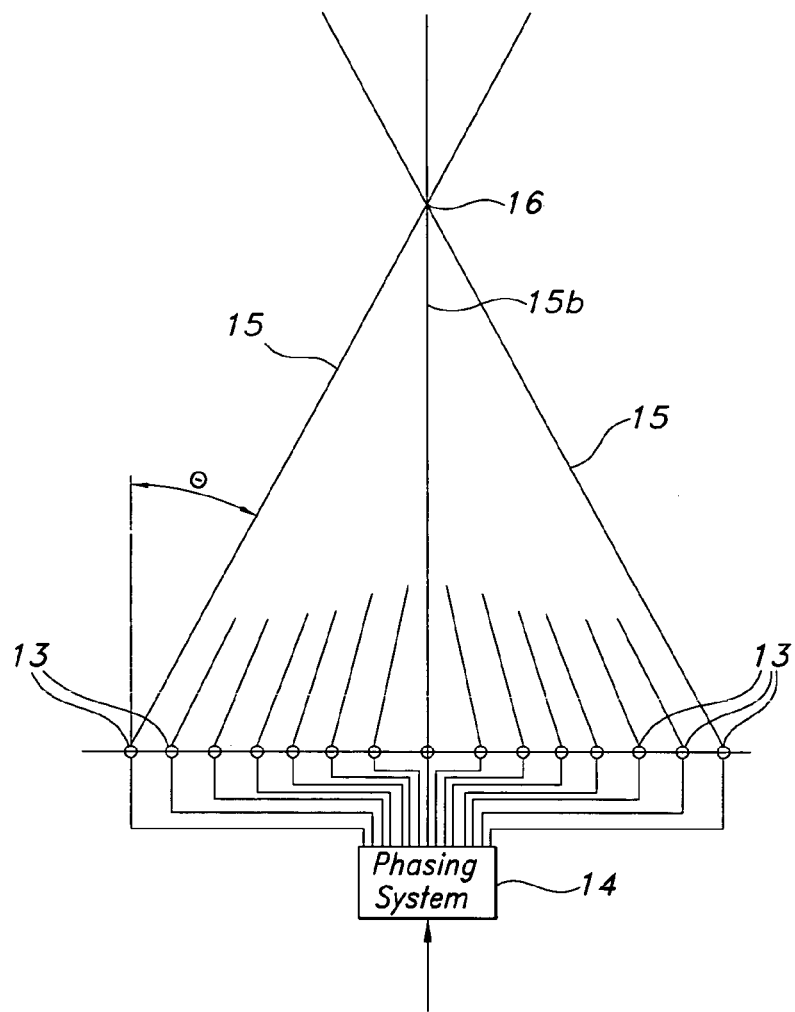
FIG. 2a illustrates driving laser diodes as a phased array in the laser transmitter of FIG. 2.

The laser diodes 13 may be driven by a phasing system 14 that that drives the laser diodes as a phased array as shown in detail in FIG. 2a. The laser diodes 13 are driven as a phased array by exciting each diode individually to produce a precisely phased group of laser beams 15 at the free space junction 16 to produce a peak output. A center laser beam 15b may be pointed straight up to determine a desired distance to the free space junction 16 and a needed convergence angle θ for each of the other beams. A delay in driving outer laser diodes 13 from the phasing system 14 can then be computed so that all beam pulses arrive at the free space junction 16 at the same time to maximize intensity. Phasing may also be used to compensate for the various convergence angles of the laser beams if the free space junction 16 is steered to another area in the sky by adjusting the delays as needed. Phasing may be computed so each data symbol arrives from each laser beam 15 at the same time at the free space junction 16 to maximize the ability to remotely detect the scattered laser beam light 15a.

The laser diodes 13 may be low-power (e.g. 5-mW) laser diodes for most applications as an example. Higher power laser diodes 13 may be used for military applications. The laser diodes 13 may preferably be short wavelength diodes due to the slightly higher scatter ability of short wavelength laser light. However any wavelength or color of laser light may be used. Some wavelengths propagate better than others while some wavelengths are easier to detect by receivers than others. Precise design details also depend on optical signal-to-noise ratio (S/N) as determined by atmospheric conditions such as rain, haze, clear, night, day, etc. and desired data rate of the communications and position location system 10.

Within the vehicle 11 a laser beam modulator 17 modulates the laser diodes 13 in the laser array 12 through the phasing system 14 with a digital signal from a digital source 18 (see FIG. 2). The digital data source 18 may be a camera delivering live video using MPEG-4 or any other digital data source. The data or communications link 19 may include a data link transmitter 19a located with the laser transmitter to communicate with a data link receiver (not shown) located with the laser receiver 20. The communications link 19 may be RF, another optical link, or some other means known in the art. The data link 19 may a land mobile radio system used by public safety organizations.

A position of the vehicle 11 may be monitored by direct transmission of free space function position or by remote triangulation known in the art by several laser receivers 20 in a vehicle position location application. Alternatively, the position of the vehicle 11 and position of the free space junction 16 in the sky may be communicated to the laser receiver 20 over the communications link 19 (see FIG. 2) to enable establishment of a high data rate covert laser communications link. Communicating the position of the free space junction 16 also enables selection of the altitude and optimization of the location of the potentially hazardous higher concentration of high-power laser light at the free space junction 16.

The laser receiver 20 at a distance receives spatial position information and computes GIS (Global Information System) coordinates received from the communications link 19 or from triangulation and computes and points its optical receiver detector 21 towards the free space junction 16 location in the sky. The receiver detector 21 may use a filter such as a bandpass filter to filter unnecessary light and may adjust the optical field of view size and optical gain to minimize background light noise by focusing on the free space junction 16 thereby rejecting as much ambient light as possible. The data rate is thus generally limited to and related to the size of the optical field integrated by the receiver detector 21. The receiver optical detector 21 demodulates the received laser light to recover the transmitted digital data from the laser transmitter. The digital data is processed (error-detection and correction), decrypted, decompressed and delivered to a video decoder (not shown) in the laser receiver 20. A video data transmission may be played back at the laser receiver 20 or transmitted through another network (not shown) for delivery or storage elsewhere.

Figure 3:
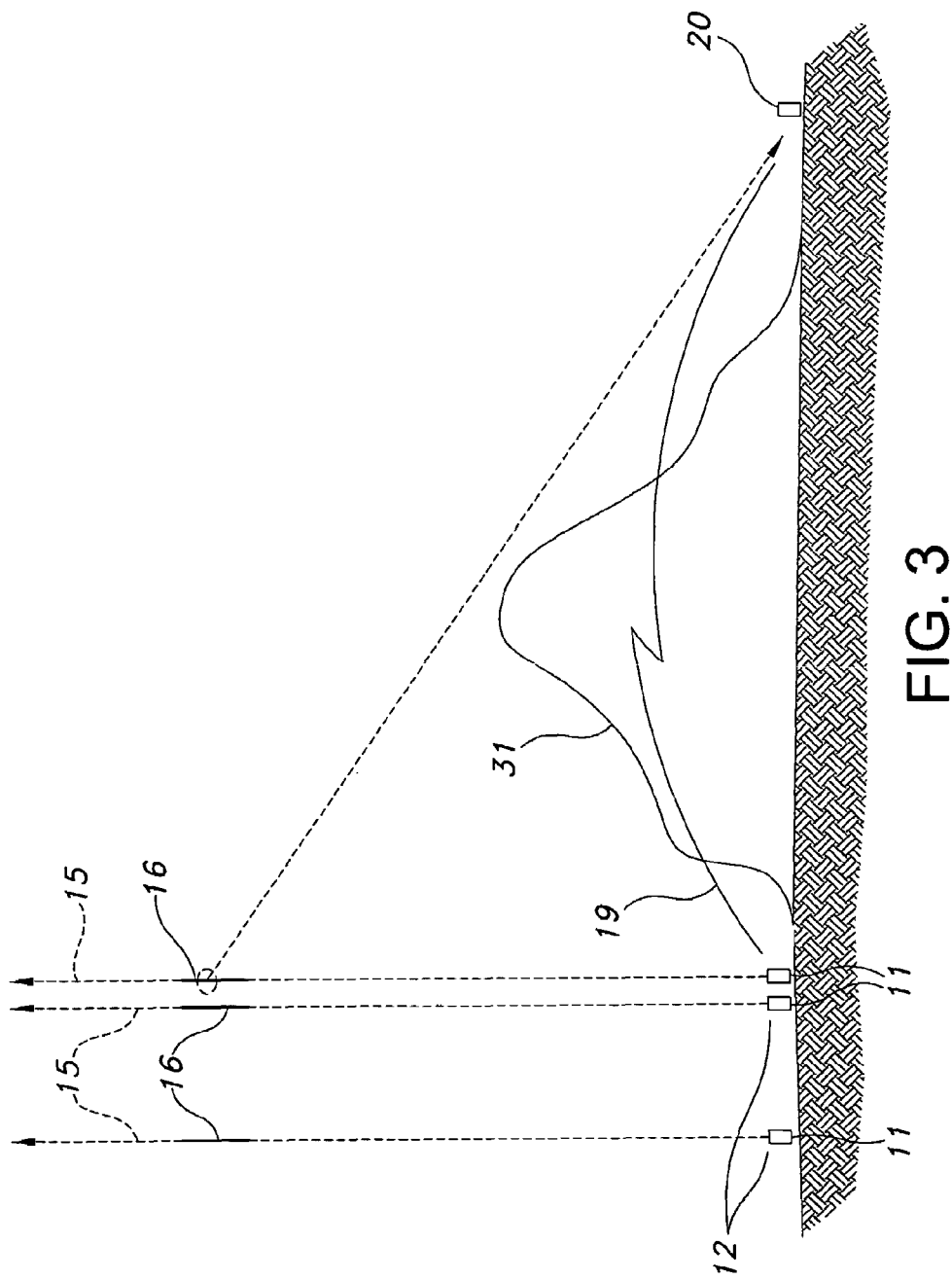
FIG. 3 shows the communications and position location system of the present invention in a rugged terrain application example.

FIG. 3 shows the communications and position location system 10 of the present invention in a rugged terrain example. In FIG. 3 vehicles 11 are each equipped with the laser transmitter shown in FIG. 2. The vehicles 11 are on one side of a hill 31 while laser receiver 20 is on another side. Line of sight communications between the vehicles 11 and the laser receiver 20 are not possible due to the hill 31. The vehicles 11 may use the low speed communications link 19 capable of communicating over the hill 31 to provide approximate GIS coordinates for each vehicle to the laser receiver 20 to assist in finding the laser scatter zone at the free space junction 16 for each vehicle 11. The free space junction 16 may optionally be spatially IPv6 address correlated. Each vehicle 11 directs its beams 15 skyward with the proper convergence angles to place the free space junction 16 at the desired altitude and sends its unique vehicle identification (ID) code.

The laser receiver 20 is directed to the free space junction 16 and adjusts its optical detector and filters to reject any unnecessary field of view to enhance S/N. The laser receiver 20 may be a multi channel vehicular optical receiver using optical components commercially available. The laser receiver 20 then detects a precise position for each vehicle 11. Triangulation may be used to locate the free space junction 16 for each vehicle 11 when three or more receivers are available. Multiple receivers may share position data of the vehicle 11 over the data link 19 to assist laser receiver 20 in resolving vehicle location.

Once the free space junction 16 for a particular vehicle 11 is located by the laser receiver 20, a high-bandwidth covert data link from the vehicle 11 to the laser receiver 20 is established. A video camera or other data source 18 with vehicle 11 is used to modulate the laser beam 15 to transmit the data to laser receiver 20 (see FIG. 2).

Figure 4:
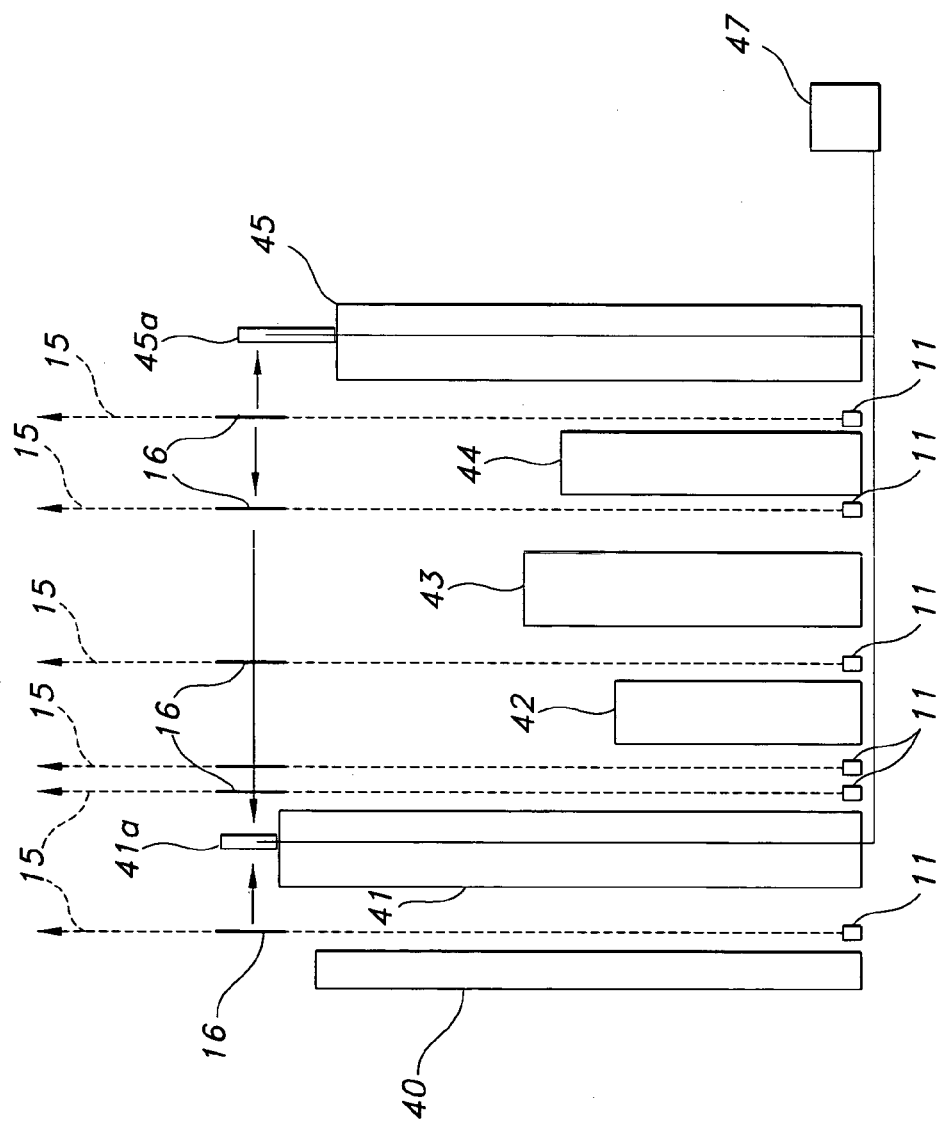
FIG. 4 shows the communications and position location system of the present invention in a city application example.

FIG. 4 shows the communications and position location system 10 of the present invention in a city application. In FIG. 4 vehicles 11 are each equipped with the laser transmitter shown in FIG. 2. The vehicles 11 are located on city streets between buildings 40-45. Buildings 41 and 45 each have a multi-channel 360 degree optical receiver 41a and 45a respectively located on top. High-speed line of sight communications between the vehicles 11 and an emergency operations center 47 are not possible due to building blockage, multipath, etc. The vehicles 11 may use the low-speed communications link 19 capable of communicating in the city to provide GIS coordinates for each vehicle to the optical receivers 41a and 45a to assist in finding the scatter zone or free space junction 16 for each vehicle 11. The apex or free space junction 16 may be IPv6 address correlated for each vehicle 11.

Each vehicle 11 directs its beams 15 skyward with the proper convergence angles to place the free space junction 16 at the desired altitude. Each vehicle 11 sends its unique vehicle ID code. The optical receivers 41a and 45a are directed to the free space junctions 16 by communications link 19 position information and adjust their optical detectors and select optical filters to reject any unnecessary light and field of view to enhance S/N. The optical receiver 41a and 45a may be directionally controlled multi-channel optical receivers using commercially available optical components. The optical receivers 41a and 45a detect a precise position for each vehicle 11. The triangulation process may again be used to locate the free space junction 16 for each vehicle 11 when three or more receivers are available.

Once the free space junction 16 for a particular vehicle 11 is located by the optical receivers 41a and 45a, a high-bandwidth covert data link from the vehicle 11 to the receivers is established. A video camera or other data source 18 with vehicle 11 is used to modulate the laser beam 15 to transmit the data to laser receiver 20.

Figure 5:
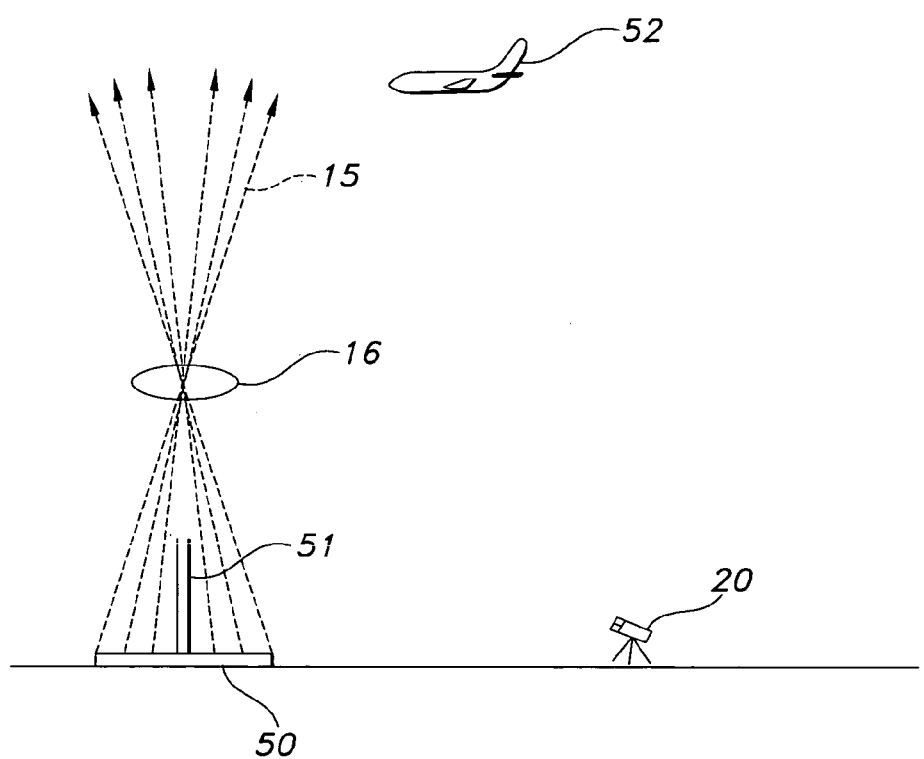
FIG. 5 shows the communications and position location system of the present invention in a fixed application.

FIG. 5 shows the communications and position location system 10 of the present invention in a fixed application. In FIG. 5 a fixed laser array 50 similar to that in FIG. 2 is placed at a base of tower 51. The tower 51 may be an existing tower such as a television transmitter tower. Laser diodes in the array 50 are modulated with video and other data similar to the laser transmitter shown in FIG. 2. The laser beams 15 are fixed at convergence angles to create the free space junction 16 directly above the existing transmitter tower 51 thereby minimizing safety issues on the ground and in the sky while maximizing line-of-sight visibility.

The danger from laser light is reduced with the configuration shown in FIG. 5 because the TV tower 51 is already marked on aeronautical maps and avoided by aircraft 52 by some distance. Aircraft 52 will not be subjected to the highest concentration of laser light at the free space junction 16 if the tower 51 is avoided. Furthermore, laser diodes 13 may individually use the beam expanders 13a to maximize energy density at the free space junction 16 while reducing individual beam energy density at higher altitude. The distribution of the many near vertical low-power beams 15 avoids eye hazards when near each laser on the ground or at distances in the air. Each laser diode 13 (see FIG. 2) operates at a relatively safe low-power level. However the convergence of laser beam 15 at the free space junction 16 in aggregate can be considered a hazard. This free space junction 16 is held above the tower 51 a few meters just above the TV tower 51 out of reach and out of range of direct contact from human eyes. Traveling above the free space junction 16, the array of low-power beams 15 again quickly diverge geometrically to safer individual beam levels. Each laser diode 13 may be powered and expanded to meet regulatory safety requirements and to prevent eye injury and danger in aircraft cockpits at a reasonable distance. Beam scatter may also be remotely detected and the laser array 12 power regulated accordingly to minimize power transmitted according to atmospheric conditions. Beam energy is directed upward at slight convergence angles thereby having little chance of entering a cockpit at typical altitudes. A trade-off may be to use lower power laser diodes in the laser array 50 on the ground converging above the tower 51 hence producing low power beams 15 that radiate into space having lower possibility of inducing eye harm or temporary blindness. Again individual laser beam expanders may be used to enhance beam density at higher altitudes.

In FIG. 5 the high optical gain high sensitivity laser receiver 20 points at the free space junction 16 above the known tower location and detects the high S/N of the free space junction 16. The laser receiver 20 may be fixed or mobile in this application where it is necessary to transmit high-speed data from a fixed point at the tower 51 to the laser receiver 20.

Most laser communications systems known in the art are end-to-end or point-to-point systems where a laser transmitter must be pointed directly at a laser receiver to establish communications. The communications and position location system 10 of the present invention uniquely differs from prior art laser communications system in that it relies on the free space junction 16 scattering the laser beams 15 due to atmospheric particulates or moisture. The laser beams 15 are pointed up for remote detection by the laser receiver 20 to clear terrain and building obstructions and not directly at a remote receiver. The precision of the laser beams 15 enables concentrated scattering and position location resolving.

It is believed that the communications and position location system and method of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A laser communications and position location system for transmitting data and comprising a laser transmitter and a laser receiver, said laser transmitter further comprising:

a laser array radiating a plurality of modulated laser beams upward at convergence angles, whereby the modulated laser beams converge at a free space junction at an altitude determined by the convergence angles, wherein said modulated laser beams are scattered at said free space junction, and wherein said laser receiver receives scattered modulated laser beam light and recovers the data, wherein the modulated laser beams form a convergence apex at the free space junction for providing a concentrated laser density area for promoting ability of the receiver to detect the scattered beams;

a modulator for modulating the laser array with the data to provide the modulated laser beams;

a data source for providing the data; and wherein the laser transmitter further comprises a data link for transmitting an approximate position of the free space junction to the laser receiver to assist in finding the free space junction.

2. The communications and position location system of claim 1 wherein the laser array comprises a plurality of laser diodes arranged in a circular array.

3. The communications and position location system of claim 1 wherein the laser receiver comprises an optical detector with filters and with an adjustable field of view and gain to minimize background light noise and to demodulate the received modulated scattered laser beam light to recover the data.

4. The communications and position location system of claim 1 wherein the laser receiver determines a precise location of the laser transmitter upon finding the free space junction.

5. The communications and position location system of claim 1 wherein at least three laser receivers determine a precise position of the laser transmitter by sharing triangulation information.

6. A communications and position location system comprising:

a laser transmitter for radiating a plurality of laser beams upward at convergence angles whereby the laser beams converge at a multi-laser beam free space junction wherein said laser beams are scattered at said free space junction producing scattered laser beam light, the laser transmitter including a data link for transmitting a position of the free space junction; and a laser receiver pointed at said free space junction to receive the scattered laser beam light, the laser receiver configured for receiving the transmitted position of the free space junction from the laser transmitter and for locating said free space junction based on said transmitted position, the laser receiver further configured for determining a precise location of the laser transmitter upon finding the free space junction;

wherein the plurality of laser beams form a convergence apex at the free space junction for providing a concentrated laser density area for promoting ability of the receiver to detect the scattered beams.

7. The communications and position location system of claim 6 wherein the convergence angles determine an altitude of the free space junction.

8. The communications and position location system of claim 6 wherein the plurality of laser beams are modulated by data at the laser transmitter thereby providing modulated scattered laser beam light received by the laser receiver.

9. The communications and position location system of claim 6 wherein the laser transmitter further comprises:

a laser array, said laser array further comprising a plurality of laser diodes arranged in a circular array;

a modulator for modulating the plurality of laser diodes with the data; and a data source for providing the data.

10. The communications and position location system of claim 9 wherein the plurality of laser diodes comprises short wavelength laser diodes.

11. The communications and position location system of claim 9 wherein the laser transmitter transmits a unique identification code.

12. The communications and position location system of claim 6 wherein the laser receiver upon finding the free space junction rejects an unnecessary field of view to enhance signal-to-noise ratio.

13. The communications and position location system of claim 6 wherein the laser receiver upon finding the free space junction uses a filter to reject unnecessary light.

14. The communications and position location system of claim 6 wherein the laser receiver determines a precise location of the laser transmitter upon finding the free space junction.

15. The communications and position location system of claim 8 wherein the laser receiver comprises an optical detector with an adjustable optical field of view and gain to minimize background light noise and to demodulate the received modulated scattered laser beam light to recover the data.

16. A method of communicating and position locating with a laser communications and position location system comprising the steps of:
   radiating with a laser transmitter a plurality of laser beams upward at convergence angles whereby the laser beams converge at a free space junction wherein a concentration and a scattering of said laser beams occurs at said free space junction thereby providing scattered laser beam light;
   transmitting with a data link a position of the free space junction for the laser receiver to find the free space junction; and
   pointing a laser receiver at said free space junction to receive the scattered laser beam light, wherein the plurality of laser beams form a convergence apex at the free space junction for providing a concentrated laser density area for promoting ability of the receiver to detect the scattered beams.

17. The method of communicating and position locating with a laser communications and position location system of claim 16 further comprising the step of setting an altitude of the free space junction with the convergence angles.

18. The method of communicating and position locating with a laser communications and position location system of claim 16 further comprising the steps of:
   modulating the plurality of laser beams with data at the laser transmitter thereby providing modulated scattered laser beam light; and
   receiving with the laser receiver the modulated scattered laser beam light.

19. The method of communicating and position locating with a laser communications and position location system of claim 16 further comprising the steps of:
   modulating with a modulator the array of laser diodes with the data; and
   providing the data from a data source.

20. The method of communicating and position locating with a laser communications and position location system of claim 16 further comprising the steps of:
   rejecting an unnecessary field of view with the laser receiver upon finding the free space junction to enhance signal-to-noise ratio; and
   filtering unwanted light.

21. The method of communicating and position locating with a laser communications and position location system of claim 16 further comprising the step of determining a precise location of the laser transmitter upon finding the free space junction.

22. The method of communicating and position locating with a laser communications and position location system of claim 18 further comprising the step of receiving the modulated scattered laser beam light with an optical detector in the laser receiver, said optical detector having an adjustable optical field of view and gain to minimize background light noise, and to demodulate the received modulated scattered laser beam light.

* * * * *